United States Patent
Benamrouche

(10) Patent No.: US 8,699,338 B2
(45) Date of Patent: Apr. 15, 2014

(54) SIGNAL PROCESSING ARRANGEMENT AND METHOD WITH ADAPTABLE SIGNAL REPRODUCTION RATE

(75) Inventor: Farid Benamrouche, Columbes (FR)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 13/060,987

(22) PCT Filed: Aug. 25, 2009

(86) PCT No.: PCT/IB2009/053731
§ 371 (c)(1),
(2), (4) Date: May 19, 2011

(87) PCT Pub. No.: WO2010/023625
PCT Pub. Date: Mar. 4, 2010

(65) Prior Publication Data
US 2011/0216847 A1 Sep. 8, 2011

(30) Foreign Application Priority Data
Aug. 29, 2008 (EP) .................................... 08290811

(51) Int. Cl.
*H04L 12/26* (2006.01)
(52) U.S. Cl.
USPC .......................................... 370/232; 318/573
(58) Field of Classification Search
USPC .......................................... 370/232; 318/573
See application file for complete search history.

(56) References Cited

U.S. PATENT DOCUMENTS

| | | | |
|---|---|---|---|
| 3,731,175 A * | 5/1973 | Hartung | 318/570 |
| 4,356,518 A * | 10/1982 | Lemoine et al. | 360/51 |
| 4,689,022 A * | 8/1987 | Peers et al. | 434/307 R |
| 5,386,493 A | 1/1995 | Degen et al. | |
| 6,356,545 B1 | 3/2002 | Vargo et al. | |
| 6,496,811 B1 * | 12/2002 | Bodnar | 706/3 |
| 6,697,356 B1 | 2/2004 | Kretschmer et al. | |

(Continued)

FOREIGN PATENT DOCUMENTS

| | | |
|---|---|---|
| CN | 1697508 A | 11/2005 |
| CN | 1798318 A | 7/2006 |

(Continued)

OTHER PUBLICATIONS

Duxbury, C., et al. "Improved Time-Scaling of Musical Audio Using Phase Locking at Transients," Audio Engineering Society Convention Paper 5530, 5 pgs. (May 2002).

(Continued)

*Primary Examiner* — Wei Zhao

(57) ABSTRACT

A signal data source supplies signal data of a stored signal that is defined relative to a original time base. The signal data is processed by adding or removing samples to adapt a reproduction rate to an adapted time base. The samples of the signal with the adapted reproduction rate are passed through a delaying buffer and the signal is rendered after it emerges from the buffer. A time converter determines time values relative to the original time base and the adapted time base. Commands are provided to control the rate used for reproduction rate adaptation. Normally, each command is accepted and used to change the rate. Information is stored after the commands have been used to change the reproduction rate. Acceptance of further commands is disabled when a predetermined number of accepted commands is stored, until at least one of the stored commands have emerged from the buffer.

16 Claims, 2 Drawing Sheets

(56) References Cited

U.S. PATENT DOCUMENTS

| | | |
|---|---|---|
| 7,467,318 B2 | 12/2008 | Bruno et al. |
| 2004/0105660 A1 | 6/2004 | Suzuki |
| 2006/0140221 A1 | 6/2006 | Yamada et al. |
| 2006/0143000 A1 | 6/2006 | Setoguchi |

FOREIGN PATENT DOCUMENTS

| | | |
|---|---|---|
| EP | 1 119 194 A2 | 7/2001 |
| EP | 1 818 932 A1 | 8/2007 |
| WO | 2007/051495 A1 | 5/2007 |
| WO | 2007/091206 A1 | 8/2007 |

OTHER PUBLICATIONS

"Digital Recording Extension to Globally Executable MPH (GEM)," DVB Project and Cable Television Laboratories Inc., DVB Document A088, 21 pgs., retrieved from the Internet at: http://www.mph.org/mph_technology/other_mph_documents/a088rev1_cmp_rev0.pdf (Apr. 2005).

International Search Report and Written Opinion for Int'l Patent Appln. No. PCT/IB2009/053731 (Dec. 4, 2009).

* cited by examiner

SIGNAL PROCESSING ARRANGEMENT AND METHOD WITH ADAPTABLE SIGNAL REPRODUCTION RATE

FIELD OF THE INVENTION

The invention relates to a circuit that performs signal rendering, such as audio or video signal rendering, and to a method of rendering signals.

BACKGROUND OF THE INVENTION

From U.S. Pat. No. 5,386,493 it is known to vary reproduction rate of recorded sound while preserving pitch. In a game playing apparatus for example, the speed may be varied dependent on player interaction. Speed variations have an effect on the time points when respective parts of the recorded sound are needed. When variable speed is used, the time of replay becomes dependent on preceding changes of the replay speed. In contrast, with constant speed the time points would follow from the start of replay and the replay rate.

The effect on the time points has consequences upstream in the audio processing stream. When the audio samples are obtained by retrieving audio data or by decoding frame-encoded digital audio data that correspond to a constant replay speed, the time points of retrieving or decoding frames will have to be adapted to changes in the replay speed. These consequences are due to the fact that two different time bases are relevant: an original time base, which identifies locations in the stored audio data and which would apply without reproduction rate adaptation, and an adapted time base identifies the time points at which samples are rendered. A translation between these different time bases is needed to control operation.

Problems arise with this translation when the audio samples are buffered between the adaptation of the stream to change the reproduction rate and rendering of the audio samples. Changes in the time base that have been effected in front of the buffer emerge with a delay behind the buffer. When many changes of the reproduction rate occur in a brief time period the translation may become unreliable.

SUMMARY OF THE INVENTION

Among others, it is an object to provide for reliable translation between the original signal time base and the adapted time base when reproduction rate adaptation is applied to a signal stream before the signal stream is delayed by a buffer.

A signal processing arrangement according to claim 1 is provided. Herein a time converter is used that controls the application of rate value to a reproduction rate adapter for a signal stream such as an audio stream. When a command to change the reproduction rate is accepted, the rate is applied by the reproduction rate adapter. The time converter stores information for at most a predetermined number of the accepted commands. The time converter disables acceptation of further ones of the commands when information for said predetermined number of accepted ones of the commands is stored, until the time converter detects that the effect of at least one of the commands has emerged from the delaying buffer. In an embodiment information for no more that one accepted command is stored at a time. This simplifies time conversion.

BRIEF DESCRIPTION OF THE DRAWINGS

These and other objects and advantageous aspects will become apparent from a description of exemplary embodiments, using the following Figures.

DETAILED DESCRIPTION OF THE EMBODIMENTS

Figure 1:
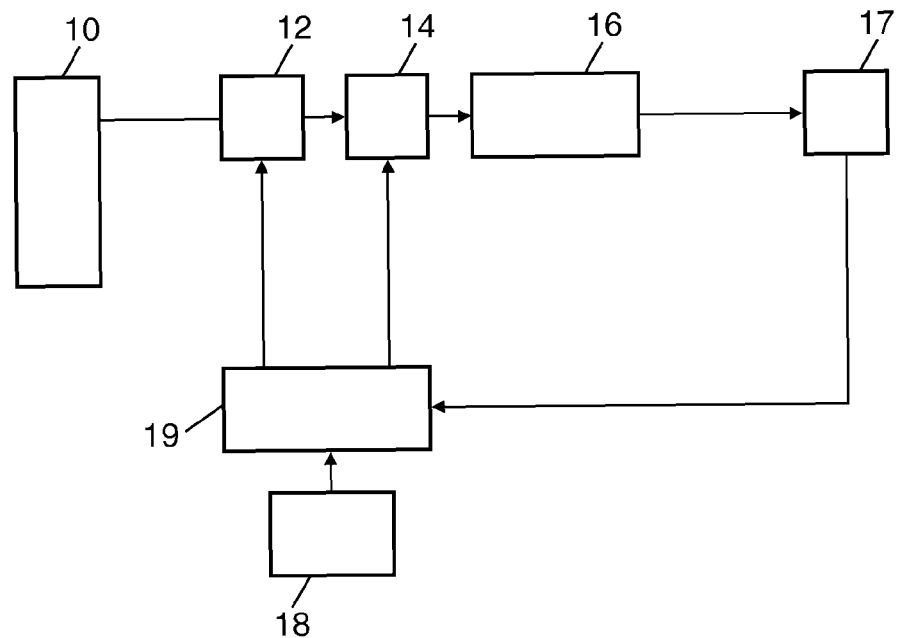
FIG. 1 shows an audio processing arrangement

FIG. 1 shows an audio processing arrangement, comprising a frame memory 10, a decoder 12, an audio reproduction rate adapter 14, a buffer 16, a rendering device 17, a rate controller 18 and a time converter 19. Decoder 12 has an input coupled to frame memory 10 and an output coupled to audio reproduction rate adapter 14. Audio reproduction rate adapter 14 has an output coupled to rendering device 17 via buffer 16. Time converter 19 has inputs coupled to outputs rendering device 17 and rate controller 18 and outputs coupled to decoder 12 and audio reproduction rate adapter 14.

Decoder 12, audio reproduction rate adapter 14, buffer 16, rendering device 17, rate controller 18 and time converter 19 may be implemented as respective circuits, part or all of which may be programmable circuits configured with a program to make them perform decoding, audio rate adaptation, rendering, rate control and time conversion. Alternatively, part or all of decoder 12, audio reproduction rate adapter 14, buffer 16, rendering device 17, rate controller 18 and time converter 19 may be implemented using respective program modules executed by a same programmable circuit, such as a personal computer (PC). In one example rendering device 17 may be an audio circuit of such a computer, buffer 16 may be a buffer used by a device driver program of the audio circuit, time converter 19 may be implemented as a software function called by a program that is used to implement decoder 12.

In operation frame memory 10 and decoder 12 function as a data source. Decoder 12 fetches frames of audio data from frame memory 10. The frames may be in any suitable format, such as MP3 frame format (MPEG 2 Layer III). Decoder 12 decodes the frames. For each frame this results in a group of audio signal samples. Audio reproduction rate adapter 14 converts the stream of samples into a converted stream of audio signal samples, wherein there is an adaptable average ratio between a first number of audio signal samples that results from a second number of audio signal samples at the output and input of audio reproduction rate adapter 14 respectively. Audio reproduction rate adapters for this purpose are known per se. Sound features of the sound signal from decoder 12 appear in the converted stream at mutual time distances that are controlled by time converter 19. Apart from the change in time scale the converted stream of samples represents the same sound, with e.g. the same pitch values of the sound and the same strengths of sound.

Buffer 16 receives blocks of sample values of the converted stream from audio reproduction rate adapter 14 and outputs sample values to audio rendering device 17. Although buffer 16 is shown as a component of the arrangement, its capacity size may not be known to designers of decoder 12 or audio reproduction rate adapter 14.

Rendering device 17 may contain a digital to analog converter coupled to a loudspeaker for example. Rendering device 17 outputs samples successively one by one. Typically, both decoder 12 and audio reproduction rate adapter 14 produce blocks (the term is used to include frames) with a plurality of samples at a time, but their block sizes need not be equal.

Rate controller 18 controls the rate value of audio reproduction rate adapter 14, i.e. the average ratio between the first number of audio signal samples that results from the second number of audio signal samples ay the output and input of audio reproduction rate adapter 14 respectively. Rate controller 18 controls the rate value of audio reproduction rate adapter 14 through time converter 19. In an embodiment rate values are not limited to integer values, or inverses of integer values.

Time converter 19 provides for translation between real time "t" in an adapted time base and time "t1" in a stored signal time base used to indicate when frames of audio data from frame memory 10 are needed. The time "t1" identifies a location in the stored audio data according to a time of replay without rate adaptation. In this way the time t1 associated with an original sample sample corresponds to the number of its position in a theoretical stream of samples without rate adaptation. Time converter 19 determines time "t1" from the time "t" at rendering device 17. Time "t" at audio renderer advances with one step each time when a sample of the stream with adapted rate is output. This determines the average sample rate at the output of audio reproduction rate adapter 14, which has to remain constant. However, because audio reproduction rate adapter 14 changes the number of samples, this means that the time t1 associated with the samples at the input of audio reproduction rate adapter 14 varies dependent on changes in the adaptation rate.

Thus any point in the sound signal has two associated time values according to an adapted time base and a stored signal time base: the time "t" when the point is rendered by audio rendering device 17, and the time t1 that indicates its position in the stored signal in memory 10. The relation between these time values depends on the rate values used by audio reproduction rate adapter 14 and a notional delay due to buffer 16. It should be noted that this is a conceptual delay, which does not correspond to a concrete time that each sample stays in buffer 16, because the input of buffer 16 is in the form of blocks that need not be input at precise times and the output of audio rendering device 17 is of samples from those blocks at precisely defined times. Accordingly the delay cannot be measured directly.

In an embodiment wherein time converter 19 is implemented as a software module, this module may be implemented as a function "getTime( )" that returns a time value "t1" corresponding to a location in the stored audio data, i.e. according to time without rate adaptation and a function getRate( ) that returns the applicable rate value R for audio reproduction rate adapter 14. In another embodiment, a function waitForTime(t1) may be used instead of getTime( ) or in addition to it, which returns only when a time "t1" has been reached that corresponds to a location in the stored audio data that would be output at time "t" but for audio rate adaptation.

The relation between the time "t" in the adapted time base when a point in the audio signal is rendered by audio rendering device 17, and the time t1 in the stored signal time base that indicates the position of the point in the stored signal in memory 10 can be computed from $$t1 = t1o + (t-to)/R$$

Herein R is the rate used by audio reproduction rate adapter 14, R being equal to N1/N2 between the first number N1 of samples at the input of audio reproduction rate adapter 14 produced from a second number N2 of samples at its input; "to" is the value of time "t" when the first sample determined with that rate R emerged from audio rendering device 17 and t1o is the value of time t1 of the first sample to which that rate R was applied.

It should be noted that this formula makes it possible to determine t1 after a rate change only after the samples after that rate change have emerged at audio rendering device, because time to is needed. Prior to that time, old values of to, t1o and R must be used and information about the new t1o and R must be kept. In principle, when a series of rate changes is made information for all these changes must be kept until samples after the changes have emerged at audio rendering device 17. When the changes in the adaptation rate occur at distinct time points to(n), the expression for the time t1 to indicate incoming samples is $$t1 = t1o(n) + (t-to(n))/R(n)$$

$$t1o(n) = t1o(n-1) + (to(n)-to(n-1))/R(n-1)$$

$$t1o(n-1) = t1o(n-2) + (to(n-1)-to(n-2))/R(n-2)$$

etc.

Herein R(n) is the adapted rate starting from time to(n), R(n) being equal to N1/N2 after that time, the ratio between the first number N1 of samples at the input of audio reproduction rate adapter 14 produced from a second number N2 of samples at its input. Thus the difference between t and t1 reflects the cumulative effect of changes in the adaptation rate R(n). Each of the time values t1o(n) can be computed only after to(n) is known, i.e. after that rate change as emerged at audio rendering device 17.

In an embodiment time converter 19 is configured to store data for computing t1 from t, i.e. to translate the adapted time base back to the stored signal time base. In particular time and rate values to, t1o and R for a last rate change that has emerged at audio rendering device 17 may be stored, as well as t1o(n) and R(n) of rate changes that have not yet emerged. For example, the t1o value may be represented as the sample number of a sample needed at a predetermined stage before sample rate adapter 14 at the time of the rate change. Memory is provided for only a predetermined limited number of such "in buffer" rate changes. A program may used to compute t1 from the formulas above when needed. Upon execution of a rate change a program may be used to store information like t1o(n) and R(n) for the rate change and upon detection that a rate change has emerged at audio rendering device 17 a program may be executed to update the to, t1o and R.

In order to ensure that no overflow of the stored information can occur, the number rate changes within a time period corresponding to the delay of buffer 16 is kept limited. Time converter 19 does not accept rate changes that would cause this number to be exceeded. In order to do so, time converter 19 may keep a count of "in buffer" rate changes, incrementing this count each time when a rate change is made and decrementing the count when a sample after rate changes has emerged from buffer 16. While the count exceeds a maximum value time converter 19 suspends or disables acceptation of new rate values from rate controller 18 and accordingly it does not apply them to audio reproduction rate adapter 14.

In an embodiment time converter 19 stores one such set of values for an "in buffer" rate change. In this embodiment the count may take the form of a flag value, set to one or zero, dependent on whether a rate change is in buffer.

Figure 1A:
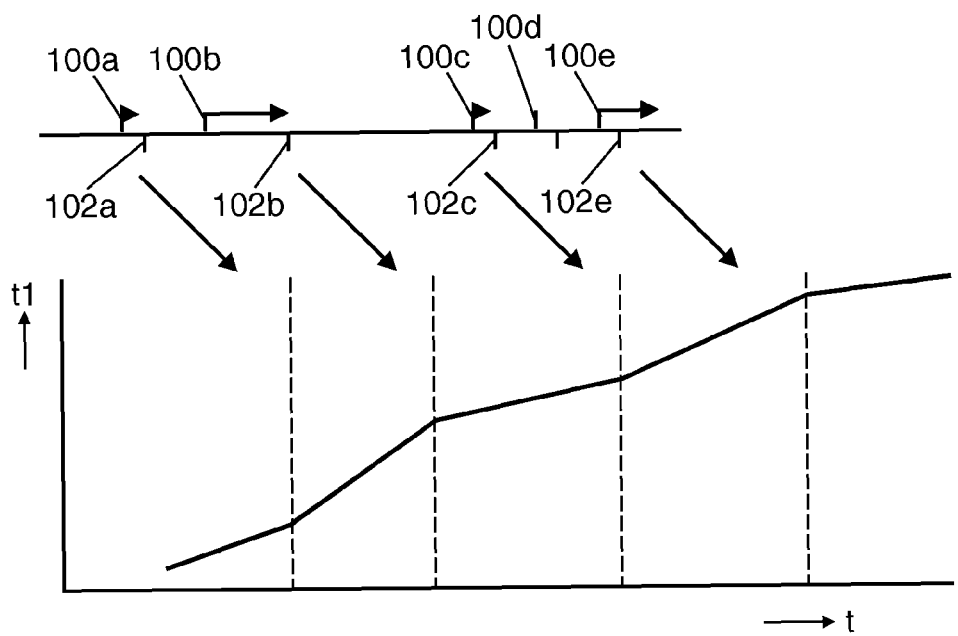
FIG. 1a illustrates time points of rate change commands

FIG. 1*a* illustrates time points of rate change commands 100*a-e* as a function of time "t" when the commands to make the rate changes are received from rate controller 18. Time points 102*a-c*, 102*e* indicate when the commands are accepted. Arrows indicate the relation between commands and acceptation. As can be seen, acceptation of part of the commands is delayed and some commands are not accepted at all in order to limit the amount of buffered information about commands. FIG. 1*a* furthermore illustrates time t1 as a function of time t at audio rendering device 17.

Figure 2:
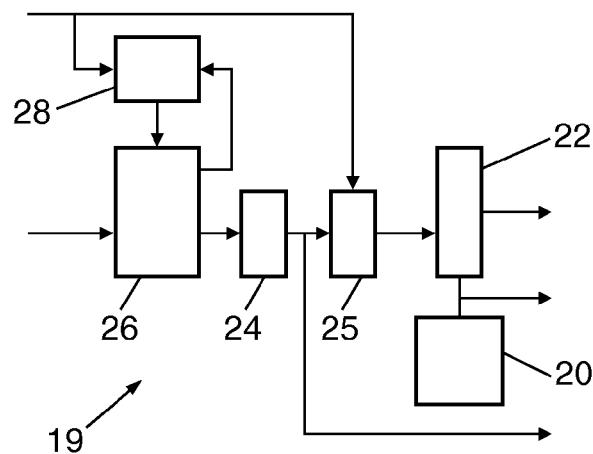
FIG. 2 shows an example of a time converter

FIG. 2 shows an example of a circuit embodiment of time converter 19, comprising a clock circuit 20, a clock counter 22, a first and second counter rate register 24, 25, a control circuit 26 and an enable register 28. Clock circuit 20 has an output coupled to clock counter 22. The output of clock circuit 20 may also be used to clock output of the audio rendering device (not shown). Clock counter 22 has a rate control input coupled to an output of second counter rate register 25. Clock counter 22 has a count output coupled to the decoder (not shown).

Enable register 28 has a set input, a reset input and an enable output. Control circuit 26 has a command input coupled to the rate controller (not shown) and an enable input coupled to the enable output of an enable register 28. Control circuit 26 an output coupled to an input of first counter rate register 24 and an output coupled to a reset of enable register 28. First counter rate register 24 has an output coupled to an input of second counter rate register 25 and to audio reproduction rate adapter 14. Time converter 19 has an input coupled to a control input of second counter rate register 24 and a reset input of enable register 28.

In operation clock circuit 20 supplies periodic clock signals to clock counter 22. Clock counter 22 maintains a clock count value. In response to a fraction of the clock signals, clock counter 22 increases the clock count value. The fraction is controlled by second counter rate register 25. In one embodiment clock counter 22 increments the clock count value once for every R1 clock signals, R1 being a rate value received from second counter rate register 25. As a result, the clock count value (time) t1 indicated by clock counter 22 obeys $$t1 = t1o + N/R1$$

Herein t1o is an initial clock count value in clock counter 22, and N is the number of clock signals from clock circuit 20 since the initial clock count value To was set. The clock count value indicates t1.

Upon receiving a command from rate controller 18 control circuit 26 may change the rate value R1. A change in rate value changes the rate used by audio reproduction rate adapter 14. The rate value in first counter rate register 24 is updated. Upon changing the rate value control circuit 26 resets enable register 28, which disables control circuit 26. Control circuit 26 is configured to disable or delay changes of the rate value in response to subsequent commands until it is enabled. Upon receiving a signal indicating detection that the last previous rate change has emerged at audio rendering device 17, enable register 28 is set and the rate value is copied from first counter rate register 24 to second counter rate register 25.

Setting and resetting enable register 28 has the effect that a rate change command is not accepted until detection of the first sample obtained after a previous rate change has reached audio rendering device 17. The delay before accepting a rate change command in time converter 19 is used to ensure that sufficient space is available to compute the time value t1. In a further embodiment, a FIFO buffer (not shown) may be added between first and second counter rate register 24, 25 to supply successive rate values. In this case enable register 28 may be replaced by a backlog counter that counts up each time when a rate change command is accepted and down each time when a rate change emerges at audio rendering device 17. In this case control circuit is disabled from accepting rate change commands when the backlog counter indicates that a maximum capacity of the FIFO buffer has been used.

In an embodiment audio reproduction rate adapter 14 is configured to include marker signals in the stream of samples that it supplies to buffer 16 to indicate the first sample emerging after a rate change. After emerging from at audio rendering device 17 the marker signals may be supplied to enable register 28 to set the enable register 28. Other solutions may be used for this purpose. For example, sample count values may be used. In this embodiment time converter 19 may comprise a further register (not shown) for storing a sample count value at audio reproduction rate adapter 14 at a time that the new rate value is made available to audio reproduction rate adapter 14 and a comparator for comparing the value from the further register with a sample count value of emerging samples at audio rendering device 17. When the count values match, this indicates that the rate change has emerged. A comparator output signal may be used to apply the set signal to enable register 28 and an update control signal to second counter rate register 25.

In an embodiment decoder 12 may use the clock count value t1 to determine when a frame of audio data will be decoded. Decoder 12 compares the clock count value derived from t1 with a decode time value Ts for the frame. The derived value may be equal to t1 plus am offset used to ensure that audio data will be decoded sufficiently early for rendering. When the derived value has reached the decode time value decoder 12 starts outputting the sample values encoded in the frame. Subsequently, decoder 12 waits until the derived clock count value reaches the decode time value for a next frame. The spacing of the decode time values Ts of successive frames corresponds to the duration of the recorded audio signal in the frames. In embodiment wherein the duration is fixed, the decode time values of successive frames are regularly spaced in terms of time t1. However, the average number of samples that must be produced from decoder 12 for a given number of cycles of clock circuit 20 depends on the rate value from second counter rate register 25.

As used herein, the phrase "emergence of an effect of a rate change" includes emergence of a first sample of a part of the signal that is subject to the rate set by the rate change. Although embodiments have been shown where time selections are made based on the detection of emergence of the effect at audio rendering device 17, it should be appreciated that emergence need not correspond to actual rendering. Audio rendering device 17 may contain a further buffer that delays rendering of a sample after emergence, in which case detection of emergence may be performed before that further buffer. Also detection of emergence, as used herein may occur in buffer 16 at a fixed distance before a sample actually leaves the buffer, in which case the point in the buffer where emergence is detected is considered to define the effective output of buffer 16, any remainder of buffer 16 being considered to be a further buffer in front of audio rendering device 17. Furthermore, although the actual time of emergence has been used for the computation of time values, it should be appreciated that any time related to the emergence may be used, such as a time with a fixed offset to the time of emergence.

In an embodiment the part of decoder 12 that determines when frames should be output may be included with memory 10, to drive output from memory 10 to decoder 12.

Figure 3:
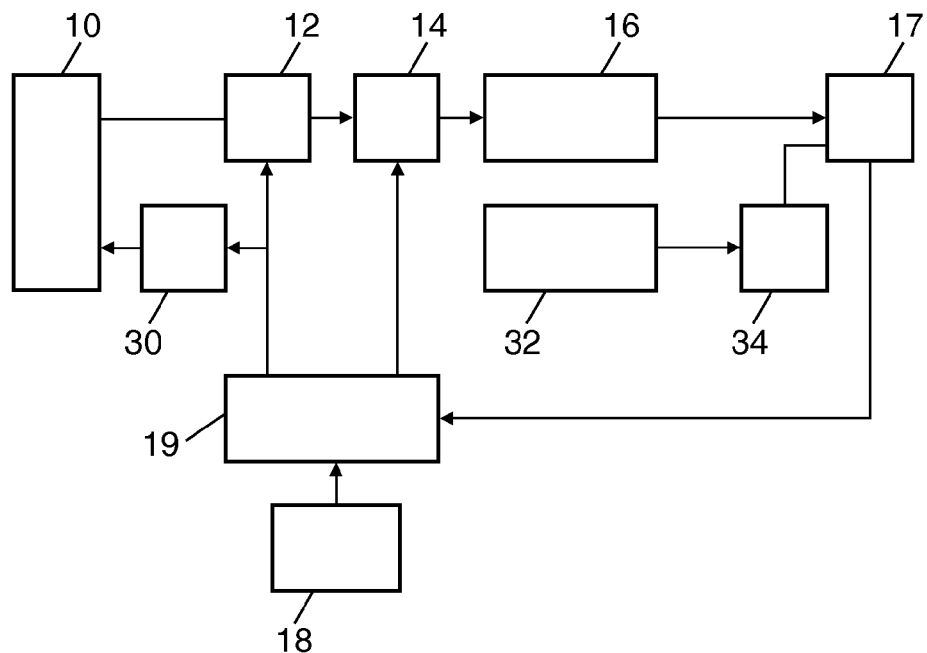
FIG. 3 shows an audio/video processing arrangement

FIG. 3 illustrates two further aspects. In an embodiment an event detector 30 is provided that receives time t1 from time converter 19 and that has an output coupled to memory 10 for selecting an audio item that has to be rendered dependent on detected events. Events such as user actions like button presses may be detected. Audio selection may depend on a time of a detected event. A table may be used for example listing for each event and for each of a number of time ranges which audio data should be played in response to the event. In this embodiment event detector 30 uses the translated time to determine the selection. Thus it is avoided that the rate adaptation affect the selection.

As another aspect the Figure shows a video decoder 32 driving a video rendering device 34. In this aspect time "t" at audio rendering device 17 may be driven by a frame clock of video rendering device 34, in order to keep audio and video in sync. Video items may also be selected under control of event detector 30. Although an application to adaptable rate audio rendering has been shown, it should be appreciated that the same technique may be applied to any type of signal to which rate adaptation is applied. Instead of an audio signal with adapted rate a video signal with adapted rate may be used for example.

Although an example has been shown with a data source that comprises memory 10 and a decoder 12 to produce time discrete samples, it should be appreciated that instead a decoder 12 may be used that produces a signal in a different representation, time discrete samples being formed only behind the reproduction rate adapter. In another embodiment the data source may not involve decoding at all, blocks of samples being read from memory with a timing controlled by time converter 19.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A signal processing circuit that supports an adaptable time rate, the signal processing arrangement comprising:
   a signal data source configured to supply signal data of a stored signal that is defined relative to an original time base;
   a signal reproduction rate adapter coupled to the signal data source and configured to output samples of an adapted signal defined relative to both an adapted time base and the original time base, wherein any point in the stored signal has two associated time values according to both the adapted time base and the original time base;
   a signal rendering device;
   a delaying buffer between the signal reproduction rate adapter and the signal rendering device configured to pass the samples to the signal rendering device;
   a rate controller configured to signal commands to change said adaptable time rate; and
   a time converter coupled between the rate controller and a control input of the signal reproduction rate adapter, configured to accept the commands, wherein some of the commands are accepted, control the adaptable time rate used by the signal reproduction rate adapter based on a last preceding accepted command, store information for a predetermined number of the accepted commands, detect when an effect of the accepted commands emerges from the delaying buffer, and disable the acceptance of further commands when the information for said predetermined number of accepted commands is stored, until detection of the effect of the accepted commands for which the information is stored.

2. The signal processing arrangement according to claim 1, wherein said predetermined number is one.

3. The signal processing arrangement according to claim 1, wherein said stored signal is an audio signal.

4. The signal processing arrangement according to claim 1, wherein said stored signal is a video signal.

5. The signal processing arrangement according to claim 1, wherein the time converter is configured to establish first time values defined relative to a signal time base corresponding to second time values defined relative to the adapted time base, based on the information for the last preceding accepted command, after the detection that at least one signal sample has emerged from the delaying buffer after entering the delaying buffer following the acceptance of the last preceding accepted command.

6. The signal processing arrangement according to claim 5, wherein the time converter is coupled to the signal data source and the signal data source is configured to control supply of the signal data dependent on the first and second time values relative to the signal time base.

7. The signal processing arrangement according to claim 1, wherein the time converter is implemented as a program module on a programmable computer, comprising instructions that, when executed by the computer, cause the computer to store information about the accepted commands for which no signal samples produced have yet emerged from the delaying buffer following the acceptance and to disable the acceptance of incoming commands when a storage space for the information is full.

8. The signal processing arrangement according to claim 1, wherein the information for the predetermined number of the accepted commands comprises a rate value.

9. The signal processing arrangement according to claim 8, wherein the information for the predetermined number of the accepted commands comprises a time value relative to a signal time base.

10. The signal processing arrangement according to claim 1, further comprising:
    a control circuit and an enable register with an enablement setting input and an enable resetting input, wherein the control circuit is coupled to the enable resetting input, and the enablement setting input is coupled to the signal rendering device.

11. The signal processing arrangement according to claim 1, wherein the time converter is configured to enable use of the stored information for each accepted command to determine time values relative to a signal time base from time values relative to the adapted time base, upon the detection that the effect of the accepted command has emerged from the delaying buffer.

12. A signal processing method, comprising:
    supplying signal data of a stored signal that is defined relative to an original time base;
    processing the supplied signal data to adapt a reproduction rate to an adapted time base, with an adaptable time rate relative to the original time base, wherein any point in the stored signal has two associated time values according to both the adapted time base and the original time base;
    passing samples of the stored signal with the adapted reproduction rate through a delaying buffer to produce a delayed signal;

rendering the delayed signal that emerges from the delaying buffer;

signaling commands to change said adaptable time rate, wherein some of the commands are accepted;

controlling the adaptable time rate used for the adapted reproduction rate based on a last preceding accepted command;

storing information for a predetermined number of the accepted commands;

detecting when effects of the accepted commands emerge from the delaying buffer; and disabling acceptance of further commands when information for said predetermined number of accepted commands is stored, until said detecting indicates said emergence for at least one command for which the information is stored.

13. A non-transitory computer program product, comprising instructions for a programmable computer that, when executed by the computer, cause the computer to:

receive commands, wherein some of the commands are accepted;

to change a reproduction rate defining an adapted time base with an adaptable time rate relative to an original time base, wherein any point in a stored signal has two associated time values according to both the adapted time base and the original time base;

control a rate used for reproduction rate adaptation based on a last preceding accepted command;

store information for a predetermined number of the accepted commands;

detect when an effect of the accepted commands emerges from a delaying buffer; and disable acceptance of further commands when the information for said predetermined number of accepted commands is stored, until the detection indicates said emergence from the delaying buffer of the effect for at least one command for which the information is stored.

14. The signal processing arrangement according to claim 10, wherein the control circuit is coupled to an input of a first counter rate register.

15. The signal processing arrangement according to claim 14, wherein the first counter rate register is coupled to an input of a second counter rate register.

16. The signal processing arrangement according to claim 10, wherein a backlog counter acts as the enable register.

* * * * *